United States Patent
Mochizuki et al.

(10) Patent No.: US 11,472,113 B2
(45) Date of Patent: Oct. 18, 2022

(54) ADDITIVE MANUFACTURING APPARATUS AND CALIBRATION METHOD THEREOF

(71) Applicant: Sodick Co., Ltd., Kanagawa (JP)

(72) Inventors: Kei Mochizuki, Kanagawa (JP); Yasuyuki Miyashita, Kanagawa (JP); Ichiro Araie, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 17/467,293

(22) Filed: Sep. 6, 2021

(65) Prior Publication Data
US 2022/0176635 A1    Jun. 9, 2022

(30) Foreign Application Priority Data

Dec. 7, 2020 (JP) .............................. JP2020-202583

(51) Int. Cl.
    *B29C 64/386*      (2017.01)
    *B29C 64/277*      (2017.01)
    *B29C 64/268*      (2017.01)
    *B33Y 50/00*      (2015.01)
    *B33Y 30/00*      (2015.01)

(52) U.S. Cl.
CPC .......... *B29C 64/386* (2017.08); *B29C 64/268* (2017.08); *B29C 64/277* (2017.08); *B33Y 30/00* (2014.12); *B33Y 50/00* (2014.12)

(58) Field of Classification Search
CPC ... B29C 64/277; B29C 64/268; B29C 64/386; B29C 64/393
See application file for complete search history.

(56) References Cited

U.S. PATENT DOCUMENTS 5,832,415 A    11/1998   Wilkening et al.
8,163,224 B2 *   4/2012   Higashi ................... B29C 35/08
                                              356/388

(Continued)

FOREIGN PATENT DOCUMENTS

CN       110785248       2/2020
CN       111867754      10/2020

(Continued)

OTHER PUBLICATIONS

"Office Action of Taiwan Counterpart Application" with English translation thereof, dated Jun. 20, 2022, p. 1-p. 21.

*Primary Examiner* — Niki Bakhtiari
*Assistant Examiner* — Nicholas J Chidiac
(74) *Attorney, Agent, or Firm* — JCIPRNET

(57) ABSTRACT

A calibration method of an additive manufacturing apparatus includes an irradiation trace forming step, an imaging step, a specifying step, and a correction step. The irradiation trace forming step scans laser beams with each of a plurality of scanners with respect to a plurality of target positions on a calibration plate installed on a molding region, and forms a plurality of irradiation traces having different shapes for each of the plurality of scanners. The imaging step simultaneously images the plurality of irradiation traces formed with respect to the same target position. The specifying step specifies a plurality of irradiated positions of the laser beam scanned by each of the plurality of scanners. The correction step generates correction data that specifies a deviation amount at any point of a laser coordinate system related to each of the plurality of scanners.

7 Claims, 16 Drawing Sheets

(56) References Cited

U.S. PATENT DOCUMENTS

| | | | |
|---|---|---|---|
| 10,688,559 B2* | 6/2020 | Okazaki | B22F 3/24 |
| 11,389,876 B2* | 7/2022 | Miyashita | B22F 10/00 |
| 2010/0176539 A1* | 7/2010 | Higashi | B22F 10/20 |
| | | | 264/497 |
| 2017/0173689 A1* | 6/2017 | Okazaki | B22F 10/31 |
| 2018/0193956 A1* | 7/2018 | Ostroverkhov | G01B 11/002 |
| 2018/0207722 A1 | 7/2018 | Feldmann et al. | |
| 2018/0333807 A1* | 11/2018 | Hasegawa | B23K 26/0648 |
| 2019/0151945 A1 | 5/2019 | Okazaki | |
| 2019/0151947 A1* | 5/2019 | Miyashita | B22F 12/00 |
| 2020/0164588 A1* | 5/2020 | Vaes | B22F 10/31 |
| 2020/0215759 A1 | 7/2020 | Roblin et al. | |
| 2021/0170490 A1 | 6/2021 | Feldmann et al. | |
| 2022/0168813 A1* | 6/2022 | Dardis | B29C 64/153 |

FOREIGN PATENT DOCUMENTS

| | | |
|---|---|---|
| JP | 2009107153 | 5/2009 |
| JP | 2017115181 | 6/2017 |
| JP | 2017170454 | 9/2017 |
| JP | 2018524476 | 8/2018 |
| WO | 2019161886 | 8/2019 |
| WO | 2020099038 | 5/2020 |

* cited by examiner

ADDITIVE MANUFACTURING APPARATUS AND CALIBRATION METHOD THEREOF

CROSS-REFERENCE TO RELATED APPLICATION

This application claims the priority benefits of Japanese application No. 2020-202583, filed on Dec. 7, 2020. The entirety of the above-mentioned patent application is hereby incorporated by reference herein and made a part of this specification.

BACKGROUND

Technical Field

The disclosure relates to an additive manufacturing apparatus and a calibration method thereof.

Description of Related Art

There are various methods for additive manufacturing. For example, an additive manufacturing method that uses a scanner such as a galvano scanner to scan a laser beam is known. Specifically, an additive manufacturing apparatus that performs powder bed fusion forms a material layer on a predetermined molding region, scans a laser beam, and irradiates a predetermined irradiation region of the material layer with the laser beam to form a solidified layer. Then, the formation of the material layer and the formation of the solidified layer are repeated, and a predetermined number of solidified layers are laminated to form a desired three-dimensional molded object.

A deviation may inevitably be generated between a controlled position of the laser beam recognized on a controller and an actual position where the laser beam actually irradiates. Therefore, as disclosed in U.S. Pat. No. 5,832,415A, it is desirable to measure the deviation amount before molding the desired three-dimensional molded object, and correct the position to be irradiated with the laser beam. For example, an additive manufacturing apparatus that calibrates a laser coordinate system irradiates a laser beam to target positions set on a calibration plate arranged on a molding region to form irradiation traces, measures irradiated positions which are the positions where the irradiation traces are actually formed, calculates the deviation amounts between the target positions and the irradiated positions of the irradiation traces, and performs correction based on the deviation amounts.

Here, as shown in US Patent Application Publication No. US2019/0151945A1, an additive manufacturing apparatus including a plurality of scanners is known. For the additive manufacturing apparatus including the plurality of scanners, it is necessary to respectively calibrate the laser coordinate system related to each scanner.

SUMMARY

Problems to be Solved

In the additive manufacturing that includes the plurality of scanners, it is desirable that the target positions of the irradiation traces formed with the scanners match each other in order to reduce mutual errors between the scanners. In addition, conventionally, the laser coordinate systems related to the plurality of scanners are calibrated in order. That is, first, the calibration plate is installed on the molding region, irradiation traces are formed on the calibration plate using one of the plurality of scanners, and the irradiation traces are imaged to calculate the deviation amount. Then, the calibration plate is replaced, irradiation traces are formed on another calibration plate using another scanner, and the irradiation traces are imaged to calculate the deviation amount.

As described above, in the conventional calibration method, the installation of the calibration plate, the formation of the irradiation traces, the imaging of the irradiation traces, and the calculation of the deviation amount are performed for each scanner. Since this method can only correct the laser coordinate system related to one scanner with one formation of the irradiation traces and one measurement of the irradiated positions, it is inefficient for the additive manufacturing apparatus equipped with the plurality of scanners.

The disclosure provides an additive manufacturing apparatus and a calibration method thereof that can reduce mutual errors between scanners and calibrate the laser coordinate systems more efficiently.

Means for Solving the Problems

According to the disclosure, a calibration method is provided for an additive manufacturing apparatus, which forms a three-dimensional molded object by repeating a material layer forming step of forming a material layer on a molding region that is a region in which the three-dimensional molded object is formed, and a solidifying step of irradiating the material layer with laser beams respectively scanned by a plurality of scanners to form a solidified layer. The calibration method of the additive manufacturing apparatus includes: an irradiation trace forming step of scanning the laser beams with each of the plurality of scanners with respect to a plurality of target positions on a calibration plate installed on the molding region, and forming a plurality of irradiation traces having different shapes for each of the plurality of scanners; an imaging step of simultaneously imaging the plurality of irradiation traces formed with respect to a same target position among the plurality of target positions with an imaging device that has an imaging sensor; a specifying step of specifying a plurality of irradiated positions of the laser beams scanned by each of the plurality of scanners based on the plurality of irradiation traces imaged in the imaging step; and a correction step of generating correction data that specifies a deviation amount at any point of a laser coordinate system related to each of the plurality of scanners based on the plurality of irradiated positions specified in the specifying step.

Further, according to the disclosure, an additive manufacturing apparatus is provided, including: a material layer former forming a material layer on a molding region that is a region in which a three-dimensional molded object is formed; an irradiation device including at least one laser source that outputs a laser beam, and a plurality of scanners that respectively scan laser beams and irradiate the material layer to form a solidified layer; an imaging device having an imaging sensor and configured to image the molding region; and a controller controlling the material layer former, the irradiation device, and the imaging device. The controller controls the irradiation device to scan the laser beams with each of the plurality of scanners with respect to a plurality of target positions on a calibration plate installed on the molding region, and form a plurality of irradiation traces having different shapes for each of the plurality of scanners, controls the imaging device to simultaneously image the plurality of irradiation traces formed with respect to a same target position among the plurality of target positions, specifies a plurality of irradiated positions of the laser beams scanned by each of the plurality of scanners based on the plurality of irradiation traces imaged by the imaging device, and generates correction data that specifies a deviation amount at any point of a laser coordinate system related to each of the plurality of scanners based on the plurality of irradiated positions specified.

Effects

According to the disclosure, irradiation traces are formed by scanning laser beams with each of a plurality of scanners with respect to a plurality of target positions. A plurality of irradiation traces are formed overlapping each other at each target position, and the irradiation traces have different shapes for each scanner. Then, a plurality of irradiation traces formed with respect to the same target position are imaged simultaneously to calculate the irradiated positions. As a result, even for an additive manufacturing apparatus that includes a plurality of scanners, mutual errors between the scanners can be reduced, and the deviation amounts between the target position and the irradiated position can be obtained at a relatively high speed, so as to calibrate the laser coordinate systems efficiently.

DESCRIPTION OF THE EMBODIMENTS

Hereinafter, embodiments of the disclosure will be described with reference to the drawings. The various features shown in the embodiments described hereinafter may be combined with each other. A calibration method described below is carried out in an additive manufacturing apparatus 1 that forms a three-dimensional molded object by repeating a material layer forming step of forming a material layer 93 on a molding region R which is a region for forming the desired three-dimensional molded object, and a solidifying step of irradiating the material layer 93 with laser beams L1 and L2 scanned by each of a plurality of scanners to form a solidified layer 95.

Figure 1:
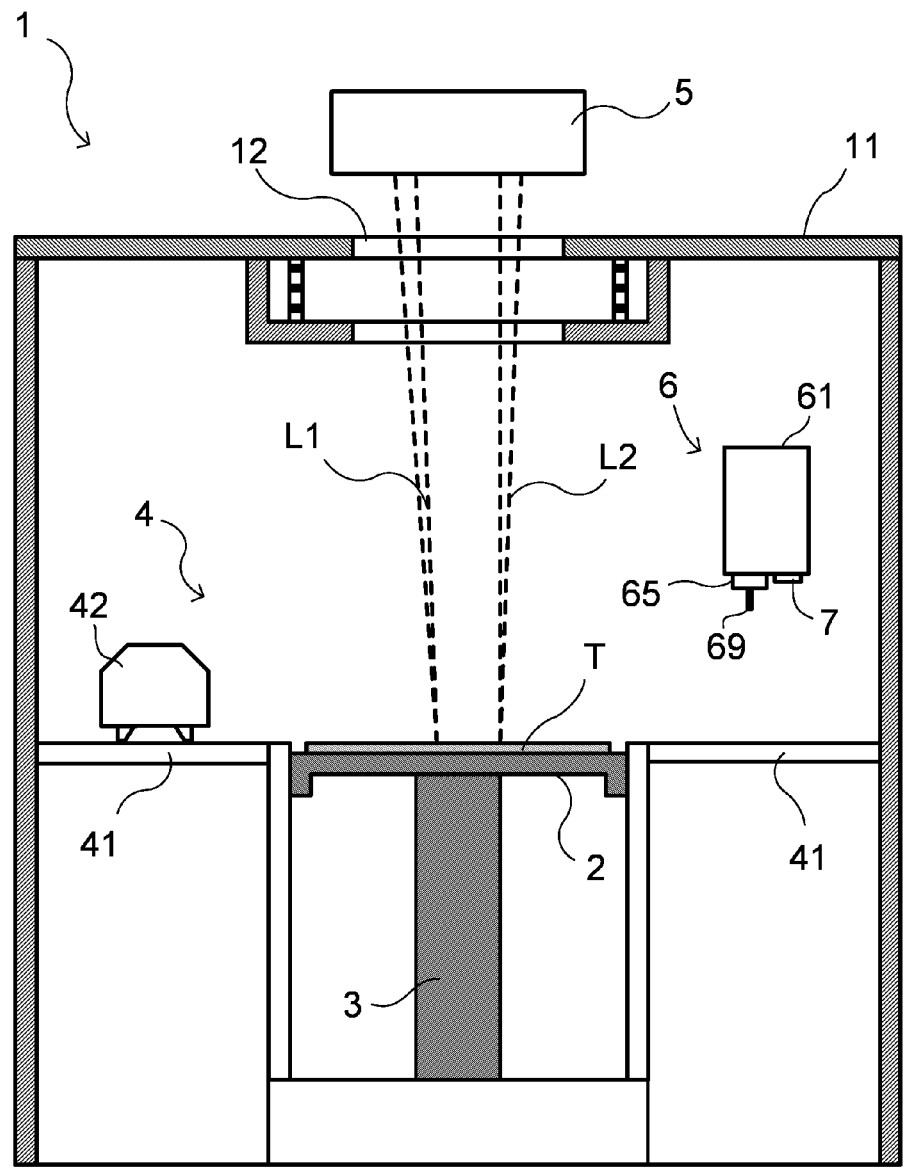
FIG. 1 is a schematic configuration view of an additive manufacturing apparatus according to an embodiment of the disclosure and shows a state during calibration.
Figure 2:
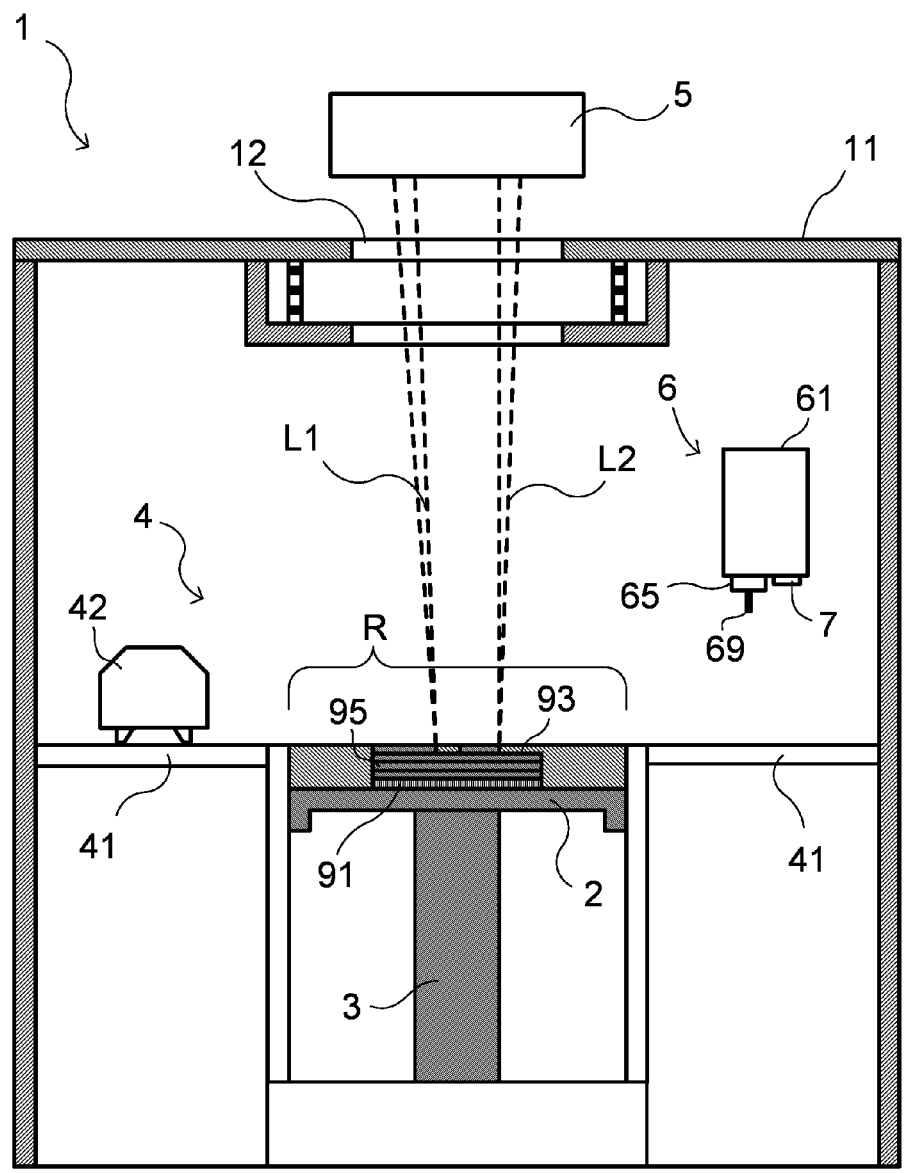
FIG. 2 is a schematic configuration view of the additive manufacturing apparatus according to the embodiment of the disclosure and shows a state during molding.

As shown in FIG. 1 and FIG. 2, the additive manufacturing apparatus 1 of this embodiment includes a chamber 11, a molding table 2, a material layer former 4, an irradiation device 5, a processing device 6, and an imaging device 7.

The chamber 11 is configured to be substantially sealed and covers the molding region R which is the region for forming the desired three-dimensional molded object. During molding, the chamber 11 is filled with an inert gas having a predetermined concentration. Further, the inert gas that contains fume generated during formation of the solidified layer 95 is discharged from the chamber 11. Desirably, the inert gas discharged from the chamber 11 is sent back into the chamber 11 after the fume is removed.

The molding table 2 is provided in the molding region R and is configured to be movable in the vertical direction by a molding table driving device 3. When the three-dimensional molded object is formed, a base plate 91 may be placed on the molding table 2. That is, the first material layer 93 may be formed on the base plate 91. Further, when laser coordinate systems of the additive manufacturing apparatus 1 is calibrated, a calibration plate T is placed on the molding table 2. A device including any actuator capable of reciprocating the molding table 2 along the vertical direction can be adopted as the molding table driving device 3.

The material layer former 4 is provided in the chamber 11. The material layer former 4 forms the material layer 93 having a predetermined thickness on the molding region R, that is, on the molding table 2. The material layer former 4 may be any device that forms the material layer 93. The material layer former 4 of this embodiment includes a base 41 having the molding region R, a recoater head 42 arranged on the base 41 and configured to be movable in the horizontal uniaxial direction, and a recoater head driving device 43 which has any actuator for driving the recoater head 42. Blades are respectively provided on both side surfaces of the recoater head 42. The recoater head 42 is supplied with material powder from a material supply device (not shown) and reciprocates in the horizontal uniaxial direction while discharging the material powder contained therein from a bottom surface. At this time, the blades flatten the discharged material powder to form the material layer 93.

The irradiation device 5 is provided above the chamber 11, and through a window 12, irradiates the material layer 93 with the laser beam L1 and the laser beam L2 and sinters or melts the material layer 93 to form the solidified layer 95. When the laser coordinate systems of the additive manufacturing apparatus 1 is calibrated, the laser beam L1 and the laser beam L2 irradiate the calibration plate T.

Figure 3:
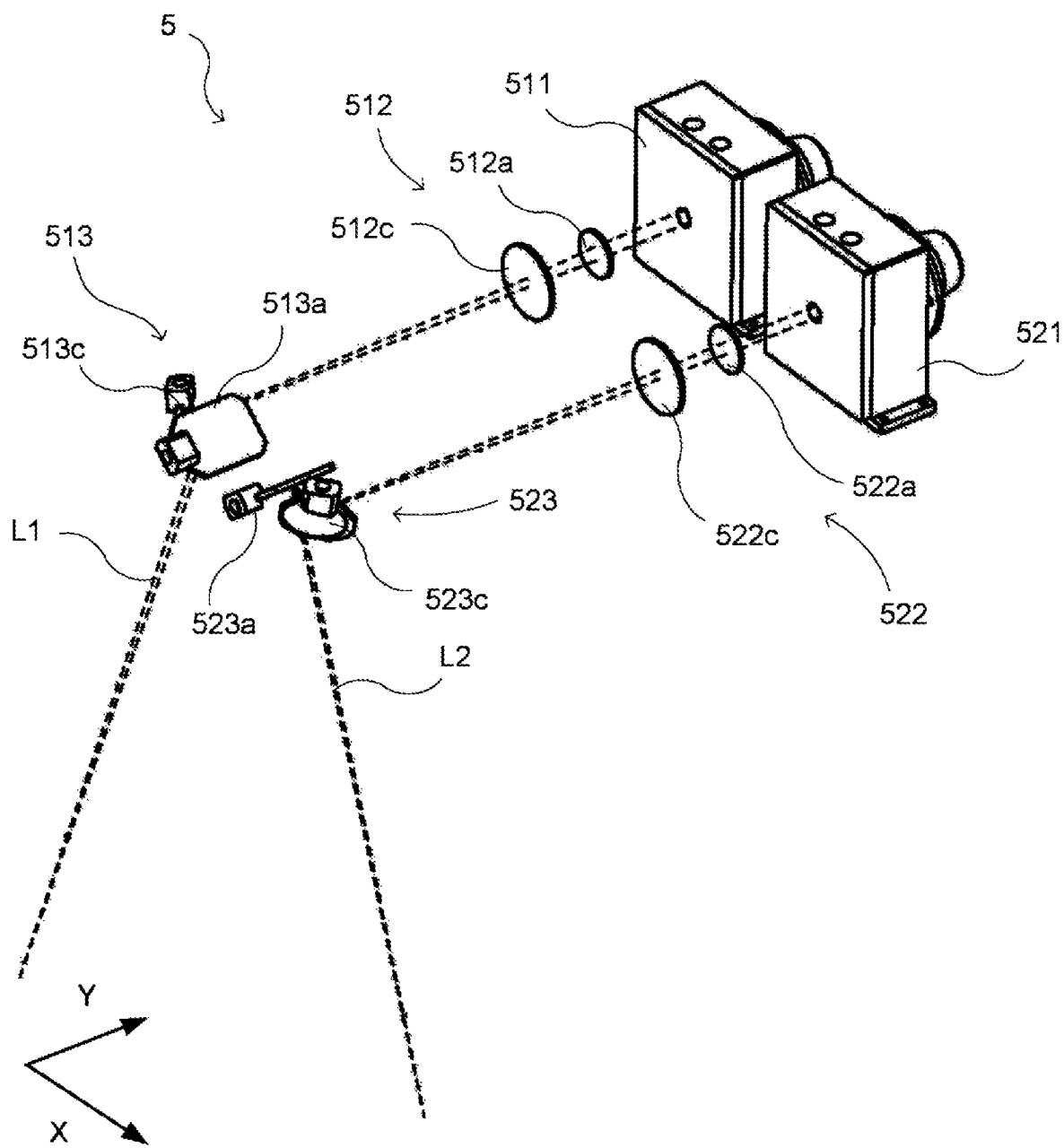
FIG. 3 is a schematic configuration view of an irradiation device.

As shown in FIG. 3, the irradiation device 5 includes a laser source 511, a focus control unit 512, and a scanner 513, and irradiates the laser beam L1 with these. Further, the irradiation device 5 includes a laser source 521, a focus control unit 522, and a scanner 523, and irradiates the laser beam L2 with these.

The laser source 511 outputs the laser beam L1. The laser beam L1 can sinter or melt the material layer 93, and is for example a $CO_2$ laser, a fiber laser or a YAG laser. The laser beam L1 output from the laser source 511 is converted into parallel light by a collimator (not shown). The focus control unit 512 has a movable lens 512a, a lens actuator 512b, and a condenser lens 512c. The movable lens 512a can be moved in the optical axis direction of the laser beam L1 by the lens actuator 512b, and adjusts the focal position of the laser beam L1 with the movement. The condenser lens 512c condenses the laser beam L1 that has passed through the movable lens 512a. The movable lens 512a and the condenser lens 512c adjust the laser beam L1 converted into parallel light by the collimator to a predetermined spot diameter. In this embodiment, the movable lens 512a is a diffusion lens, but may be a condenser lens. The scanner 513 is a galvano scanner in this embodiment. The scanner 513 has an X-axis galvano mirror 513a, an X-axis mirror actuator 513b that rotates the X-axis galvano mirror 513a, a Y-axis galvano mirror 513c, and a Y-axis mirror actuator 513d that rotates the Y-axis galvano mirror 513c. The scanner 513 scans the laser beam L1 and irradiates a predetermined irradiation region of the material layer 93 with the laser beam L1 to form the solidified layer 95. Specifically, the scanning of the laser beam L1 in the X-axis direction is controlled by controlling the rotation angle of the X-axis galvano mirror 513a, and the scanning of the laser beam L1 in the Y-axis direction is controlled by controlling the rotation angle of the Y-axis galvano mirror 513c.

The laser source 521 outputs the laser beam L2. The laser beam L2 can sinter or melt the material layer 93, and is for example a $CO_2$ laser, a fiber laser or a YAG laser. The laser beam L2 output from the laser source 521 is converted into parallel light by a collimator (not shown). The focus control unit 522 has a movable lens 522a, a lens actuator 522b, and a condenser lens 522c. The movable lens 522a can be moved in the optical axis direction of the laser beam L2 by the lens actuator 522b, and adjusts the focal position of the laser beam L2 with the movement. The condenser lens 522c condenses the laser beam L2 that has passed through the movable lens 522a. The movable lens 522a and the condenser lens 522c adjust the laser beam L2 converted into parallel light by the collimator to a predetermined spot diameter. In this embodiment, the movable lens 522a is a diffusion lens, but may be a condenser lens. The scanner 523 is a galvano scanner in this embodiment. The scanner 523 has an X-axis galvano mirror 523a, an X-axis mirror actuator 523b that rotates the X-axis galvano mirror 523a, a Y-axis galvano mirror 523c, and a Y-axis mirror actuator 523d that rotates the Y-axis galvano mirror 523c. The scanner 523 scans the laser beam L2 and irradiates a predetermined irradiation region of the material layer 93 with the laser beam L2 to form the solidified layer 95. Specifically, the scanning of the laser beam L2 in the X-axis direction is controlled by controlling the rotation angle of the X-axis galvano mirror 523a, and the scanning of the laser beam L2 in the Y-axis direction is controlled by controlling the rotation angle of the Y-axis galvano mirror 523c.

In this embodiment, the laser source 511 and the laser source 521 are respectively provided for the scanners 513 and 523, but the configuration may be made to split the laser beam output from one light source with a beam splitter or the like. In other words, the irradiation device only needs to have at least one laser source and a plurality of scanners. Further, the irradiation device may have three or more scanners, and may be configured to be capable of scanning three or more laser beams simultaneously. The irradiation device 5 is used not only for forming the solidified layer 95 but also for forming predetermined irradiation traces on the calibration plate T.

The processing device 6 cuts a surface and unnecessary portions of the solidified layer 95. The processing device 6 includes a processing head 61, a processing head driving device 63, and a cutting tool 69. The processing head driving device 63 may have any actuator, and moves the processing head 61 to any position above the molding region R in the chamber 11. For example, the processing head driving device 63 has an X-axis driving device that moves the processing head 61 in the X-axis direction which is a predetermined horizontal direction, a Y-axis driving device that moves the processing head 61 in the Y-axis direction which is a horizontal direction orthogonal to the X-axis, and a Z-axis driving device that moves the processing head 61 in the Z-axis direction which is a predetermined vertical direction.

The processing head 61 has a spindle 65. The spindle 65 is configured so that it can hold the cutting tool 69 such as an end mill and be rotated by a spindle motor 67. The cutting tool 69 rotated by the spindle 65 cuts and processes the surface and unnecessary portions of the solidified layer 95.

The additive manufacturing apparatus 1 may not be provided with a cutting device, and the cutting device may have another configuration. For example, the cutting device may include a processing head provided with a turning mechanism that holds a cutting tool such as a tool bit and rotates the cutting tool around a rotation axis in the vertical direction, and a processing head driving device for horizontally driving the processing head. At this time, the processing head driving device has, for example, a pair of first horizontal movement mechanisms, a gantry provided in the pair of first horizontal movement mechanisms, and a second horizontal movement mechanism attached to the gantry and to which the processing head is fixed.

The imaging device 7 is configured to be capable of imaging at least a part of the molding region R, and images the irradiation traces to acquire position information of the irradiation traces during calibration of the laser coordinate systems described later. The irradiation traces are marks that are formed on the calibration plate T by irradiation of the laser beams L1 and L2 and can be recognized by the imaging device 7. The imaging device 7 may have any imaging sensor capable of imaging the irradiation traces, and is for example a CCD (Charge Coupled Device) camera.

In this embodiment, the imaging device 7 is provided on the processing head 61 of the processing device 6 and is moved to any position in the chamber 11 by moving the processing head 61 with the processing head driving device 63. This configuration is preferable because it is not necessary to separately provide a driving device for moving the imaging device 7. However, the driving device for moving the imaging device 7 may be provided separately. Further, the imaging device 7 may be fixed at a predetermined position in the chamber 11 as long as the region that can be imaged by the imaging device 7 covers all the irradiation traces.

Figure 4:
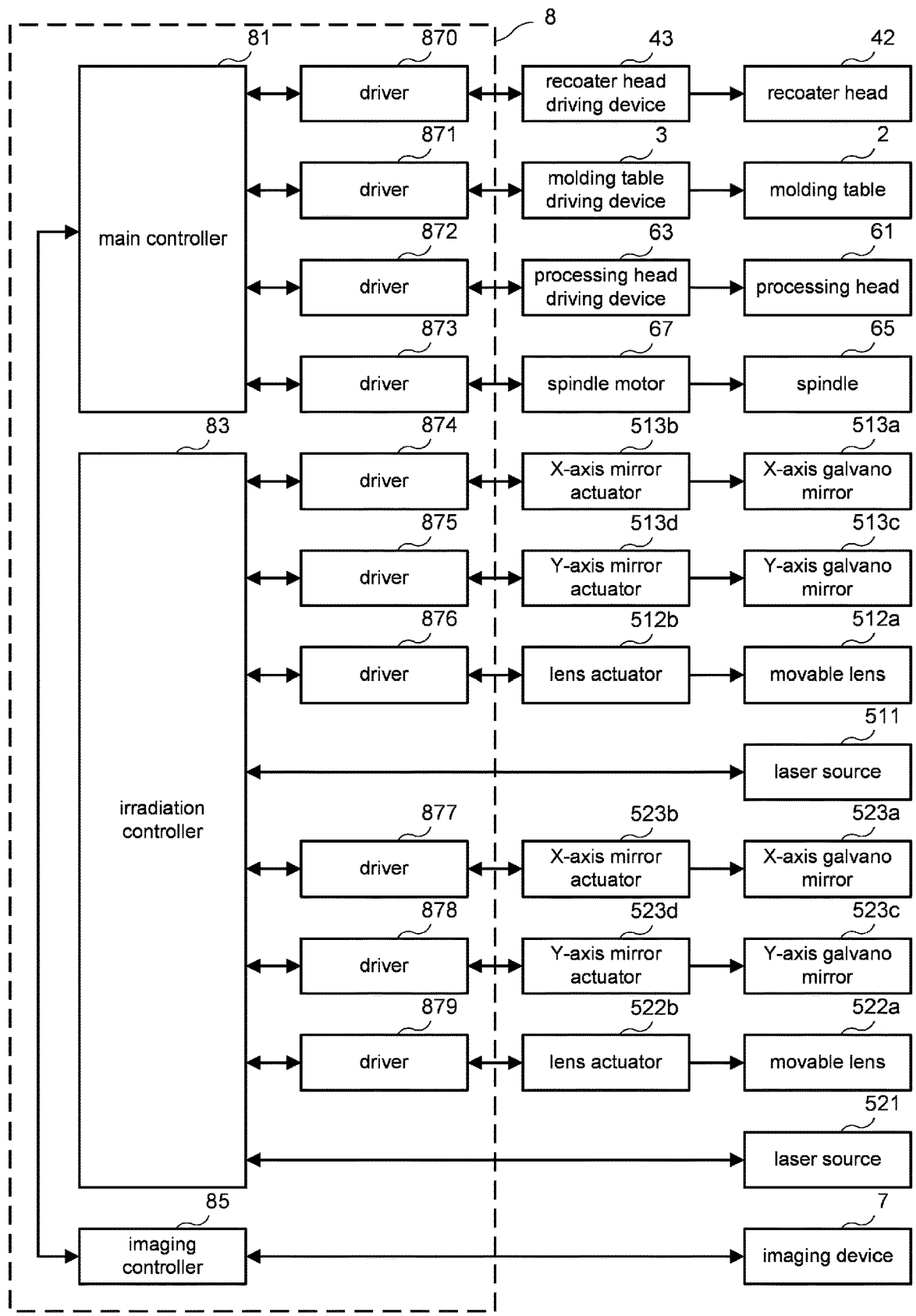
FIG. 4 is a block diagram of a controller.

Here, a controller 8 of the additive manufacturing apparatus 1 will be described. As shown in FIG. 4, the controller 8 of this embodiment includes a main controller 81, an irradiation controller 83, an imaging controller 85, and drivers 870, 871, 872, 873, 874, 875, 876, 877, 878, and 879. The main controller 81, the irradiation controller 83, and the imaging controller 85 may be respectively configured by optionally combining hardware and software. For example, the main controller 81, the irradiation controller 83, and the imaging controller 85 respectively have a CPU (Central Processing Unit), a RAM (Random Access Memory), a ROM (Read Only Memory), an auxiliary storage device, and an input/output interface. Further, in this embodiment, the main controller 81, the irradiation controller 83, and the imaging controller 85 are configured separately, but at least two of the main controller 81, the irradiation controller 83, and the imaging controller 85 may be configured integrally.

The main controller 81 controls the recoater head 42, the molding table 2, the processing head 61, and the spindle 65 via the drivers 870, 871, 872, and 873 according to a project file created by a CAM (Computer Aided Manufacturing) device (not shown). Further, the main controller 81 sends a molding program including commands related to the scanning of the laser beams L1 and L2 in the project file to the irradiation controller 83.

In addition, in calibrating the laser coordinate systems, the main controller 81 drives the processing head 61 to move the imaging device 7 to a position where the irradiation traces can be imaged, and sends an irradiation command of the laser beams L1 and L2 related to the formation of the irradiation traces to the irradiation controller 83 and sends an imaging command of the irradiation traces to the imaging controller 85. The above-mentioned control related to the main controller 81 may be performed by the irradiation controller 83 or the imaging controller 85.

The irradiation controller 83 controls the irradiation device 5 based on the molding program sent from the main controller 81 and correction data of the laser coordinate systems. Specifically, the irradiation controller 83 controls the rotation angles of the X-axis galvano mirror 513a and the Y-axis galvano mirror 513c to control the position of the laser beam L1 via the drivers 874 and 875. Further, the irradiation controller 83 controls the position of the movable lens 512a and adjusts the focal position of the laser beam L1 via the driver 876. Further, the irradiation controller 83 controls the laser source 511 to adjust the intensity of the laser beam L1 and switch on/off the laser beam L1. The irradiation controller 83 controls the rotation angles of the X-axis galvano mirror 523a and the Y-axis galvano mirror 523c to control the position of the laser beam L2 via the drivers 877 and 878. Further, the irradiation controller 83 controls the position of the movable lens 522a and adjusts the focal position of the laser beam L2 via the driver 879. Further, the irradiation controller 83 controls the laser source 521 to adjust the intensity of the laser beam L2 and switch on/off the laser beam L2.

In addition, in calibrating the laser coordinate systems, the irradiation controller 83 controls the irradiation device 5 based on the irradiation command sent from the main controller 81, and forms the irradiation traces at desired positions on the calibration plate T. At this time, the irradiation traces having different shapes are formed by the laser beams L1 and L2 respectively scanned by the scanners 513 and 523 with respect to a plurality of the same target positions on the calibration plate T. Further, the irradiation controller 83 compares the coordinate data of the target positions of the irradiation traces with the coordinate data of the actual irradiated positions of the irradiation traces acquired from the imaging controller 85, and generates the correction data that specifies a deviation amount at any point of the laser coordinate systems. The above-mentioned control related to the irradiation controller 83 may be performed by the main controller 81 or the imaging controller 85.

In calibrating the laser coordinate systems, the imaging controller 85 images the irradiation traces based on the imaging command sent from the main controller 81, and acquires the position information of the irradiation traces. At this time, the imaging controller 85 controls the imaging device 7 so as to simultaneously image a plurality of irradiation traces formed with respect to the same target position. The imaging controller 85 analyzes the acquired position information, digitizes it as coordinate data, and sends it to the main controller 81 and the irradiation controller 83. The above-mentioned control related to the imaging controller 85 may be performed by the main controller 81 or the irradiation controller 83.

Any plate may be used as the calibration plate T as long as the irradiation traces can be formed thereon, but it is desirable that the calibration plate T have a flat surface and be less likely to be affected by temperature, humidity, etc. The calibration plate T may be configured to include an irradiation target and a base board to which the irradiation target is attached. The irradiation target is a sheet member on which the irradiation traces can be formed by irradiation of the laser beams L1 and L2, and is for example black paper or thermal paper. The base board is a plate member having a desired flatness, and is for example a glass plate. The calibration plate T is placed on the molding table 2 so that the plurality of target positions are located on the calibration plate T.

Figure 5:
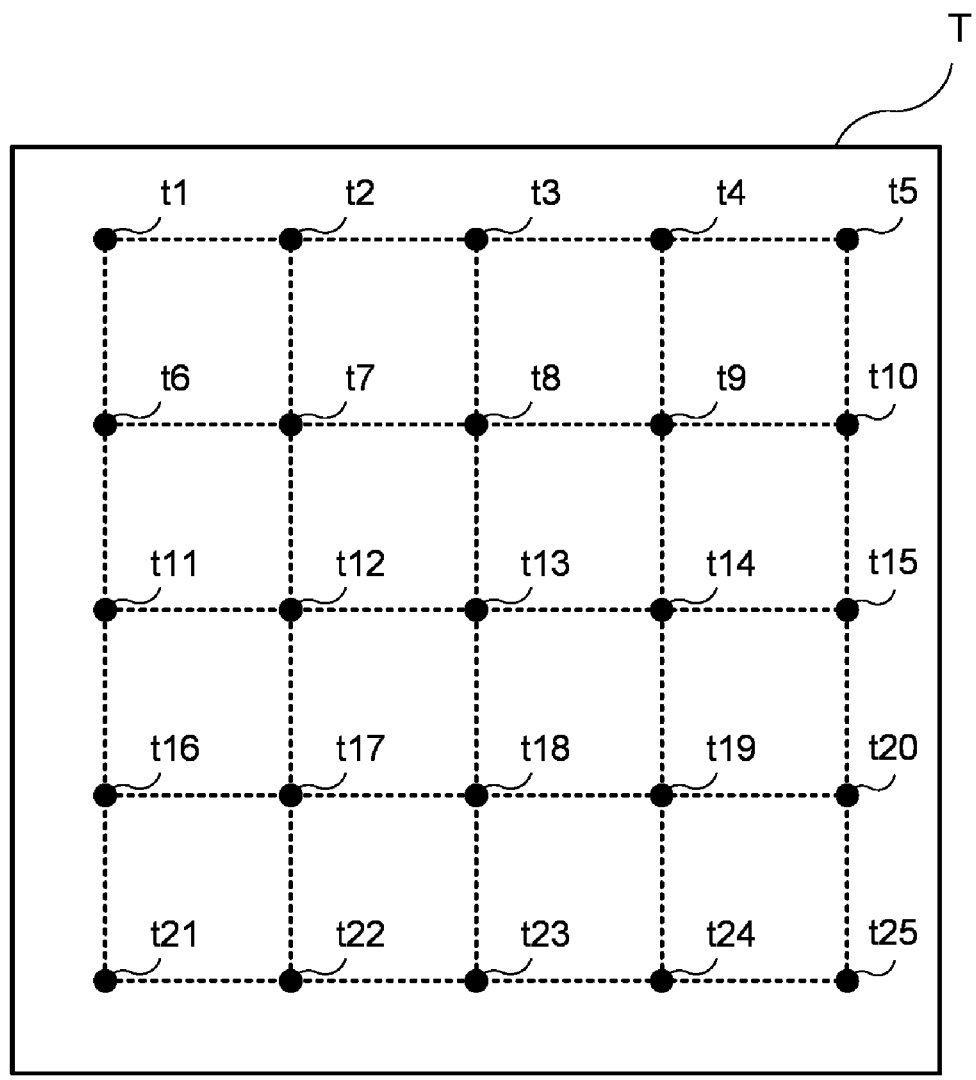
FIG. 5 shows an arrangement example of target positions.
Figure 6A:
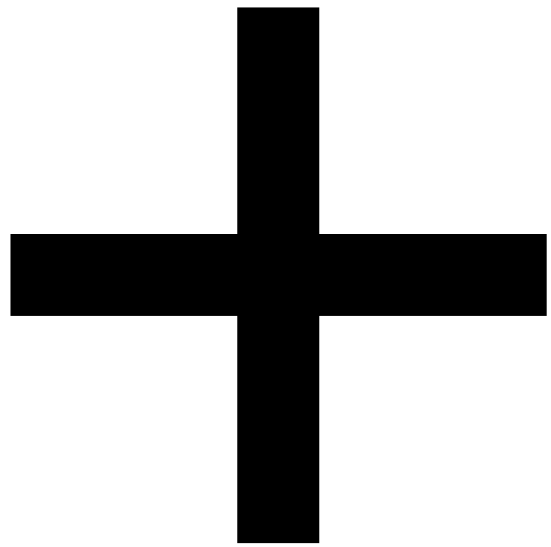
FIG. 6A shows a cross-shaped irradiation trace.
Figure 6B:
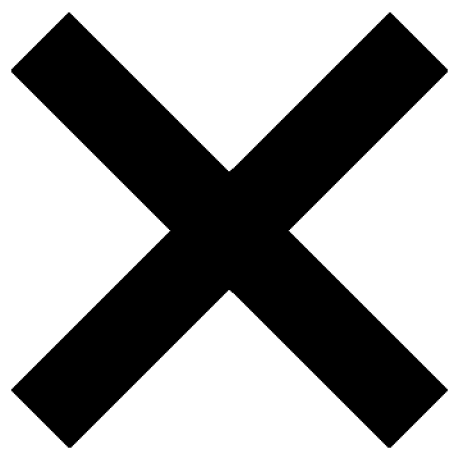
FIG. 6B shows an X-shaped irradiation trace.
Figure 6C:
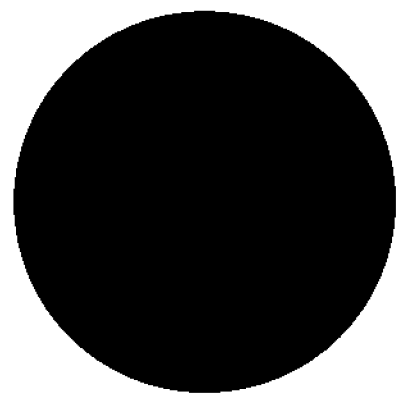
FIG. 6C shows a circular irradiation trace.
Figure 6D:
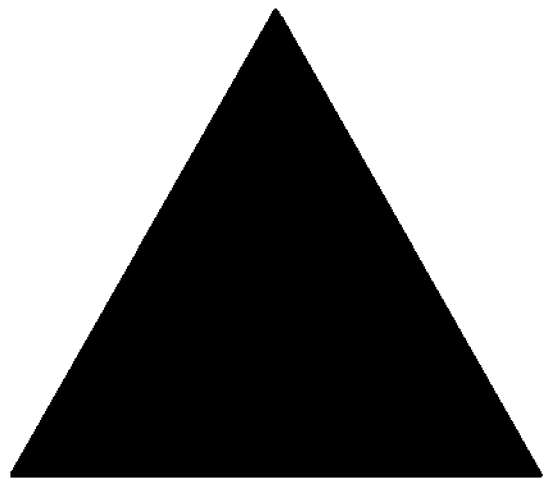
FIG. 6D shows an equilateral triangular irradiation trace.
Figure 6E:
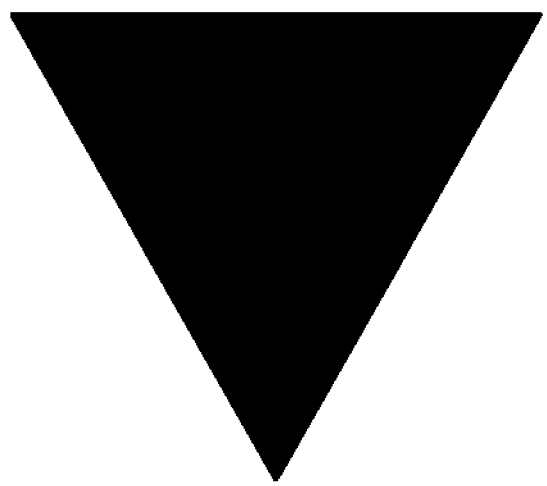
FIG. 6E shows an inverted equilateral triangular irradiation trace.

Next, the target positions which are the targets to be irradiated with the laser beam L1 and the laser beam L2 when calibrating the laser coordinate systems of the additive manufacturing apparatus 1 will be described. The target positions are a plurality of coordinates set on the molding region R, and each target position is one coordinates on molding region R recognized on the controller 8. The laser beam L1 and the laser beam L2 are irradiated to each target position to form the irradiation traces. In other words, in forming the irradiation traces, the laser beam L1 and the laser beam L2 are irradiated so that the coordinates of one predetermined point which can be detected by the imaging device among the irradiation traces having a predetermined shape match the coordinates of the target position. The number and locations of the target positions are not particularly limited, but it is desirable that the target positions be evenly distributed on the molding region R. In this embodiment, as shown in FIG. 5, a total of 25 target positions t1 to t25, five in the longitudinal direction and five in the transverse direction, are arranged in a grid pattern at predetermined intervals on the molding region R, that is, on the calibration plate T.

Next, the irradiation traces formed on the calibration plate T will be described. The irradiation trace has a shape in which at least one predetermined point in the irradiation trace can be specified. In the following, unless otherwise specified, the irradiated position of the irradiation trace refers to the one point that can be specified. The irradiation device 5 is controlled so that the irradiated positions and the target positions of the irradiation trace match each other, and the irradiation traces are formed on the calibration plate T. However, in reality, the irradiated positions and the target positions may deviate from each other. As illustrated in FIG. 6A to FIG. 6E, the irradiation traces formed by each of the laser beam L1 and the laser beam L2 are selected from a plurality of shape patterns such as a cross shape, an X shape, a circle, an equilateral triangle, and an inverted equilateral triangle. The cross-shaped and X-shaped irradiation traces are composed of two intersecting line segments. The irradiation trace composed of two intersecting line segments is formed so that the intersection of the line segments coincides with the target position. Further, the irradiation trace having a shape without an intersection of line segments such as a circle, an equilateral triangle, and an inverted equilateral triangle is formed so that the center of gravity of the shape coincides with the target position, for example. Nevertheless, the shapes of the irradiation traces shown here are merely examples, and irradiation traces of various shapes such as a rectangle, a rhombus, a trapezoid, and an isosceles triangle may be used.

In addition, at a predetermined target position, the irradiation trace formed by the laser beam L1 and the irradiation trace formed by the laser beam L2 have different shapes. Therefore, as illustrated in FIG. 7A to FIG. 7D, the irradiation traces formed by both the laser beam L1 and the laser beam L2 become a shape in which the cross shape and the X shape overlap, a shape in which the cross shape and the circle overlap, a shape in which the X shape and the circle overlap, a shape in which the cross and the equilateral triangle overlap, etc. The shapes of the irradiation traces respectively formed by the laser beam L1 and the laser beam L2 do not have to be the same at all the target positions. Further, even when the additive manufacturing apparatus is configured to be capable of scanning three or more laser beams simultaneously, the irradiation traces formed by the laser beams at the predetermined target position have different shapes. When the additive manufacturing apparatus is configured to be capable of scanning four laser beams simultaneously, the irradiation trace may have a shape in which the cross shape, the X shape, the circle, and the equilateral triangle overlap, as illustrated in FIG. 7E. Of course, the irradiation trace may be an overlap of other shapes.

The imaging controller 85 of the controller 8 specifies the irradiated positions from a plurality of irradiation traces which are overlapping. When the irradiation trace is formed by two line segments, the imaging controller 85 may specify the intersection of the line segments as the irradiated position. Since the line segments formed by the laser beams L1 and L2 have a predetermined width, when the intersection is calculated, the center lines of the line segments may be calculated, and the intersection of the center lines may be used as the intersection of the line segments. Further, when the irradiation trace has a shape without an intersection of line segments such as the circle, the equilateral triangle, and the inverted equilateral triangle, the imaging controller 85 of the controller 8 may specify the center of gravity of the irradiation trace as the irradiated position.

Figure 7A:
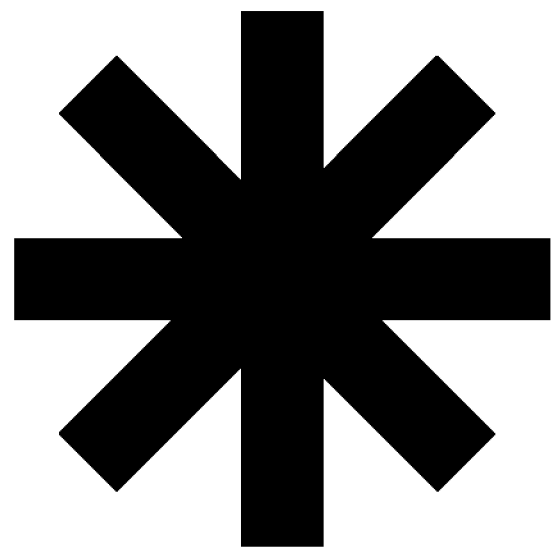
FIG. 7A shows a state where the cross-shaped irradiation trace and the X-shaped irradiation trace overlap.
Figure 7B:
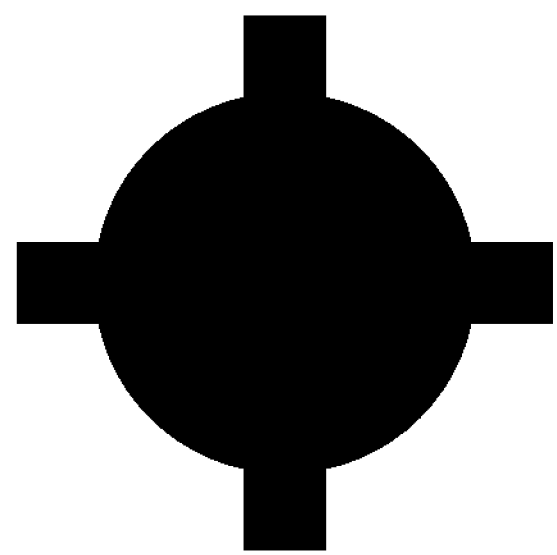
FIG. 7B shows a state where the cross-shaped irradiation trace and the circular irradiation trace overlap.
Figure 7C:
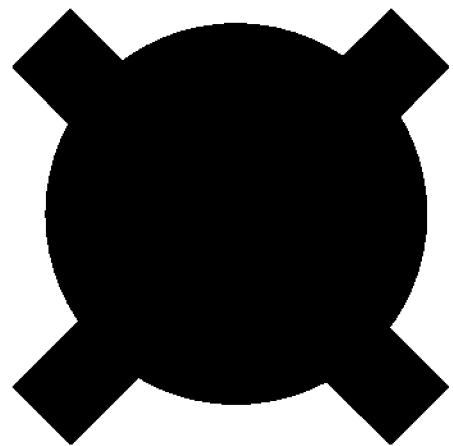
FIG. 7C shows a state where the X-shaped irradiation trace and the circular irradiation trace overlap.
Figure 7D:
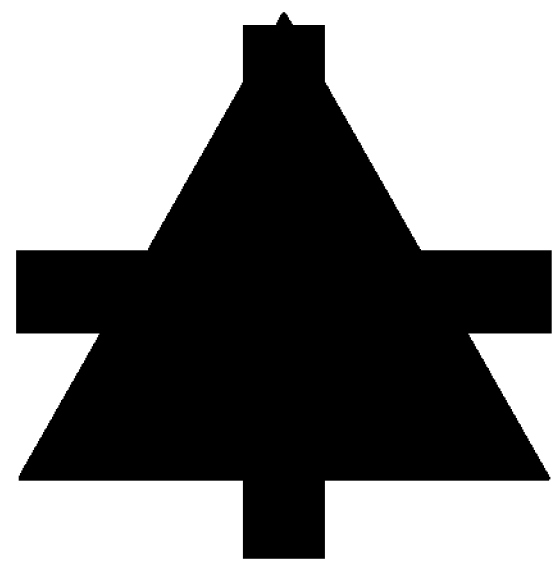
FIG. 7D shows a state where the cross-shaped irradiation trace and the equilateral triangular irradiation trace overlap.
Figure 7E:
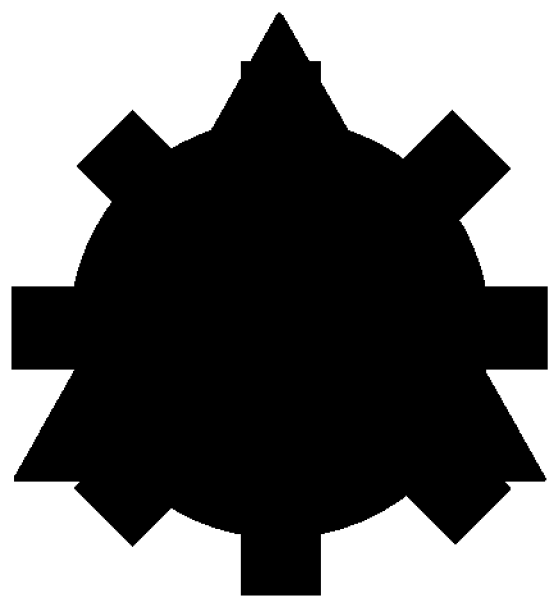
FIG. 7E shows a state where the cross-shaped irradiation trace, the X-shaped irradiation trace, the circular irradiation trace, and the equilateral triangular irradiation trace overlap.
Figure 8A:
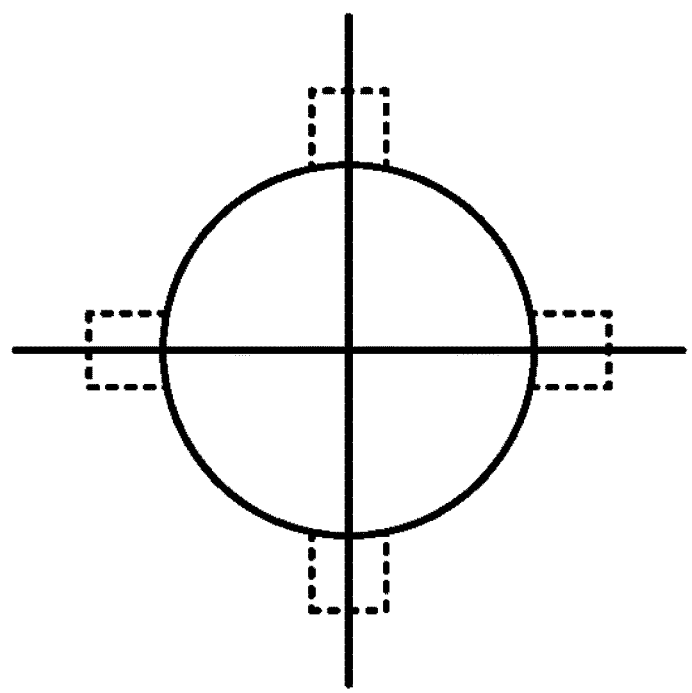
FIG. 8A is an explanatory view of a method of specifying irradiated positions of the cross-shaped irradiation trace and the circular irradiation trace.
Figure 8B:
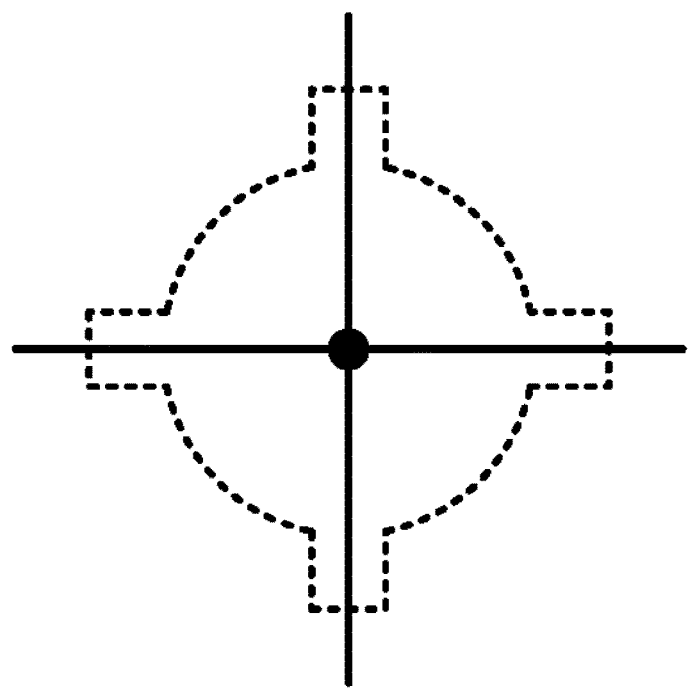
FIG. 8B is an explanatory view of the method of specifying the irradiated positions of the cross-shaped irradiation trace and the circular irradiation trace.
Figure 8C:
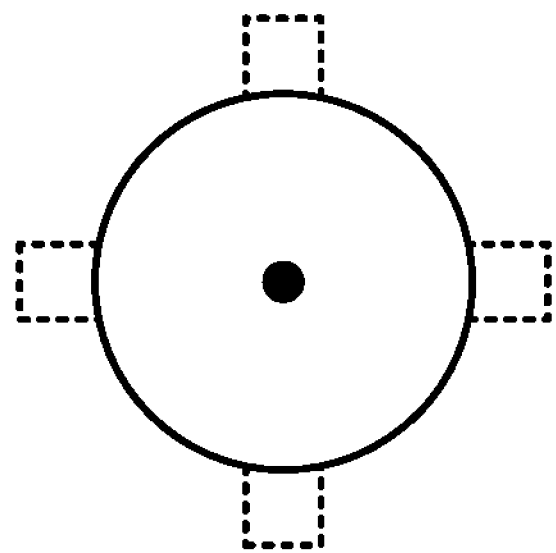
FIG. 8C is an explanatory view of the method of specifying the irradiated positions of the cross-shaped irradiation trace and the circular irradiation trace.
Figure 9A:
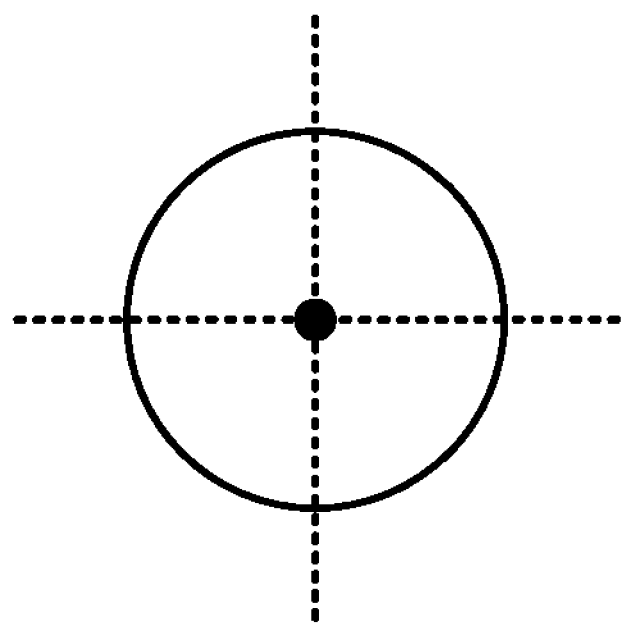
FIG. 9A shows the center of gravity of the circular irradiation trace.
Figure 9B:
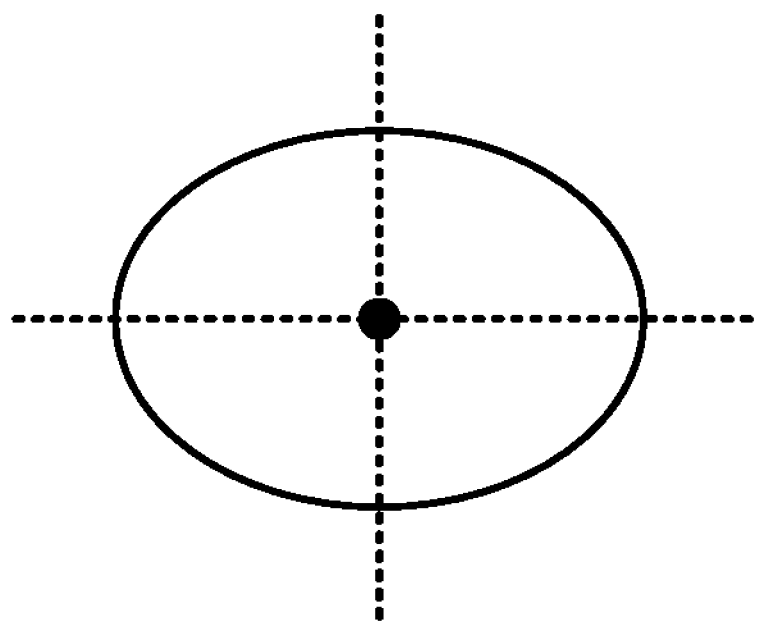
FIG. 9B shows the center of gravity of the distorted circular irradiation trace.
Figure 9C:
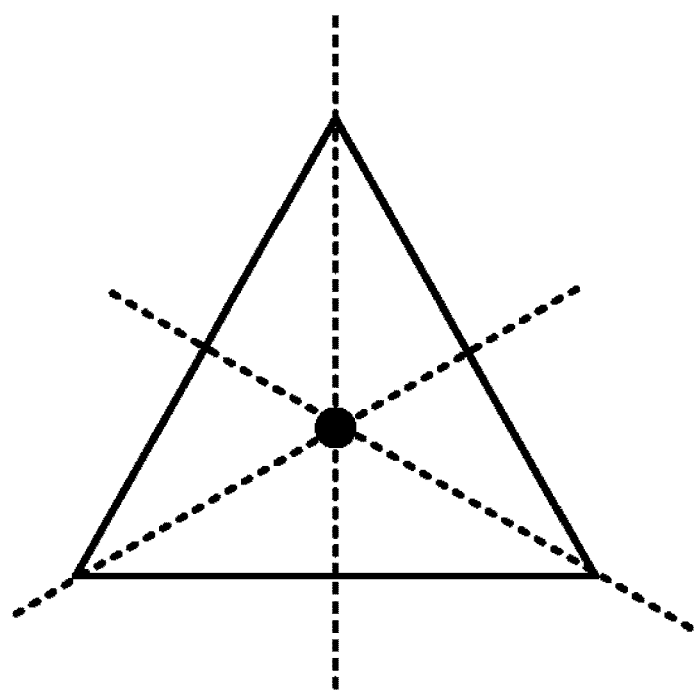
FIG. 9C shows the center of gravity of the equilateral triangular irradiation trace.
Figure 9D:
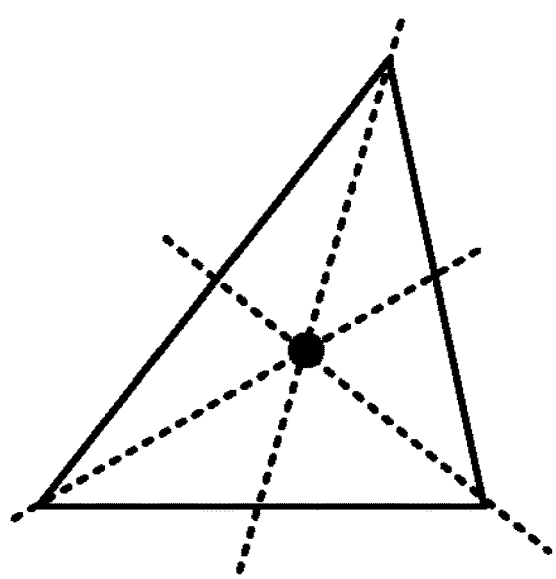
FIG. 9D shows the center of gravity of a distorted triangular irradiation trace.

Here, the irradiation traces in which the cross-shaped irradiation trace and the circular irradiation trace shown in FIG. 7B overlap will be taken as an example for describing a method of specifying the irradiated positions. As shown in FIG. 8A, the imaging controller 85 specifies the center lines of the line segments and the circular contour from the irradiation traces imaged by the imaging device 7. Then, as shown in FIG. 8B, the imaging controller 85 focuses on the center lines of the line segments and specifies the intersection of the center lines as the irradiated position of the cross-shaped irradiation trace. Further, as shown in FIG. 8C, the imaging controller 85 focuses on the contour of the circle and specifies the center of gravity of the circle as the irradiated position of the circular irradiation trace.

As shown in FIG. 9A to FIG. 9D, since the laser coordinate system before calibration may be distorted, the irradiation traces may also be distorted. The center of gravity of the irradiation trace having the circular shape, the equilateral triangular shape, or the like is specified as the irradiated position. Thereby, the irradiated position can be properly specified not only when the irradiation trace is a normal circle but also when the irradiation trace is distorted into an elliptical shape. Similarly, the irradiated position can be properly specified regardless of whether the irradiation trace is a normal equilateral triangle or is distorted into a triangle that is not an equilateral triangle.

Figure 10:
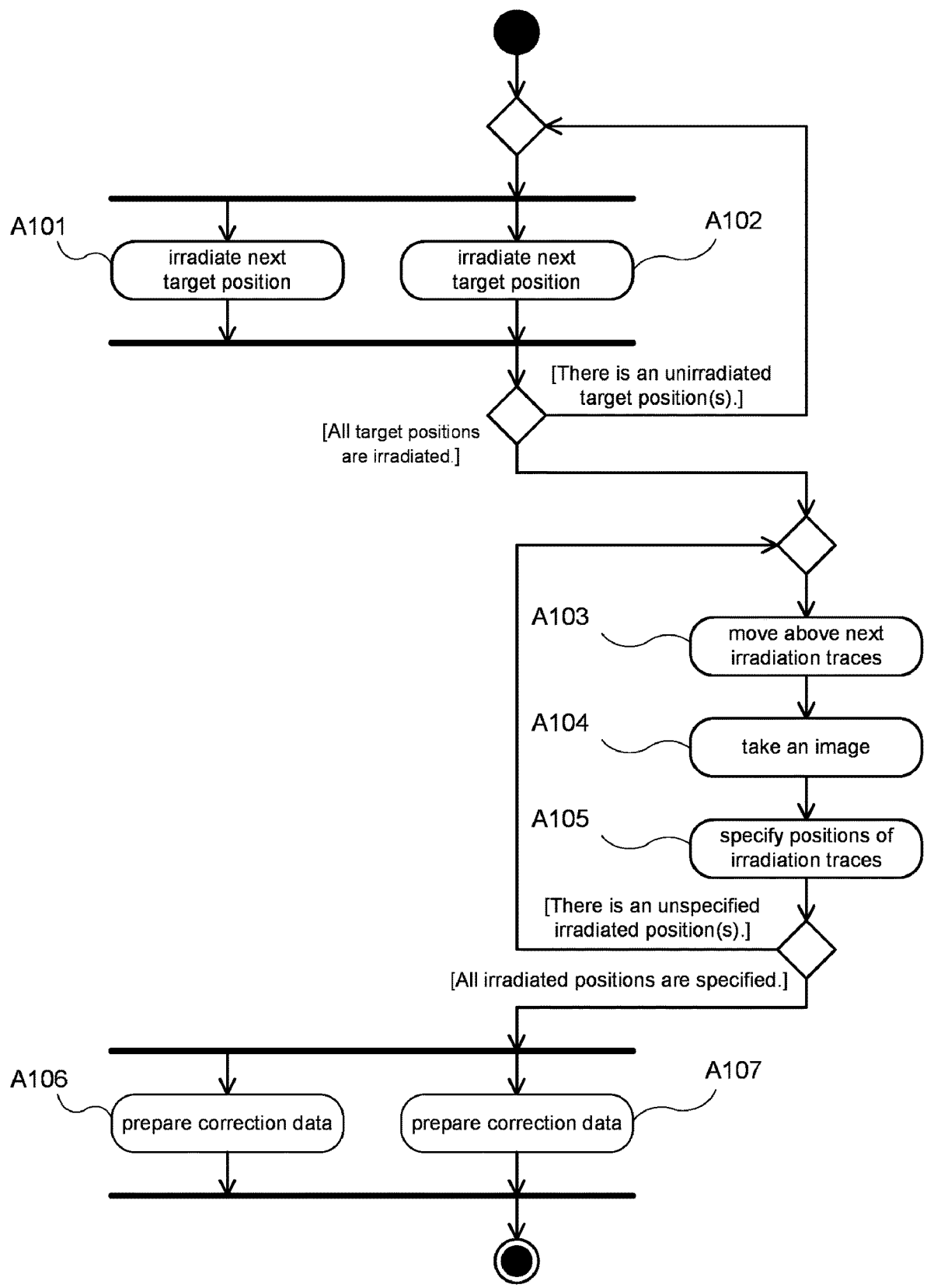
FIG. 10 is an activity diagram showing an operation flow of the additive manufacturing apparatus.

The laser coordinate systems are calibrated in advance when forming the desired three-dimensional molded object with the additive manufacturing apparatus 1 described above. The calibration of the laser coordinate systems may be performed at any timing, for example after mechanical adjustment or before the start of molding. Preferably, the calibration of the laser coordinate systems is performed every time the molding is started. Here, an operation flow at the time of calibrating the laser coordinate systems of the additive manufacturing apparatus 1 will be described with reference to FIG. 10.

First, the calibration plate T is installed on the molding region R, that is, the molding table 2 in the chamber 11. Preferably, the position of the molding table 2 is adjusted so that an upper surface of the calibration plate T coincides with an upper surface of the material layer 93 at the time of the subsequent additive manufacturing. Further, in order to bring the inside of the chamber 11 closer to the environment at the time of the subsequent additive manufacturing, it is desirable that the chamber 11 be filled with the same type of inert gas as that at the time of the subsequent additive manufacturing.

Next, an irradiation trace forming step is carried out. The irradiation device 5 irradiates the target position t1 on the calibration plate T with the laser beam L1 to form an irradiation trace (A101), and irradiates the target position t1 on the calibration plate T with the laser beam L2 to form an irradiation trace (A102). At this time, the shape of the irradiation trace formed by the laser beam L1 at the target position t1 and the shape of the irradiation trace formed by the laser beam L2 at the target position t1 are different. The same process is repeated until all the target positions are irradiated with the laser beam L1 and the laser beam L2 to form irradiation traces.

Preferably, in the irradiation trace forming step, the laser beam L1 and the laser beam L2 respectively scanned by the scanners of the irradiation device 5 are simultaneously irradiated to the calibration plate T. In other words, the irradiation trace forming step performed with the laser beam L1 and the irradiation trace forming step performed with the laser beam L2 are performed in parallel. The laser beam L1 and the laser beam L2 may be simultaneously irradiated to the same target position, or may be simultaneously irradiated to different target positions. By forming the irradiation trace with the laser beam L1 and the irradiation trace with the laser beam L2 simultaneously, the time required for forming the irradiation traces can be shortened.

Subsequently, an imaging step is carried out. By moving the processing head 61, the imaging device 7 is moved directly above the target position t1 (A103). Then, the imaging device 7 images the irradiation traces formed at the target position t1 on the calibration plate T, and image data is obtained (A104). At this time, since the irradiation traces formed by the laser beam L1 and the laser beam L2 overlap and exist in the vicinity of the target position t1, the imaging device 7 simultaneously images a plurality of irradiation traces formed with respect to the same target position.

Then, a specifying step is carried out. The imaging controller 85 analyzes the image data and specifies the actual irradiated positions of the irradiation traces (A105). In this way, the irradiated positions of the laser beam L1 and the laser beam L2 respectively scanned by the scanners of the irradiation device 5 are specified based on the irradiation traces imaged in the imaging step.

The imaging step and the specifying step are repeated until the irradiated positions of all the irradiation traces are specified. The specifying step may be performed after the imaging step for all the irradiation traces is completed. Alternatively, the irradiation trace forming step and the imaging step may be performed simultaneously as long as the laser beams L1 and L2 do not interfere with the processing head 61 or the like.

Next, a correction step is carried out. The irradiation controller 83 compares the coordinates of the target positions of the irradiation traces formed by the laser beam L1 with the coordinates of the actual irradiated positions of the irradiation traces formed by the laser beam L1, and obtains the deviation amount between the target positions and the actual irradiated positions. Further, the irradiation controller 83 also estimates and obtains the deviation amount other than the coordinates at which the irradiation traces are formed, based on the deviation amount of the irradiation traces. In this way, the irradiation controller 83 generates correction data that specifies the deviation amount at any point of the laser coordinate system related to the scanner 513 (A106). In the same procedure, the irradiation controller 83 generates correction data that specifies the deviation amount at any point of the laser coordinate system related to the scanner 523 (A107). These correction data will be used in the subsequent additive manufacturing.

Then, when the correction step is completed, the additive manufacturing apparatus 1 ends the calibration process of the laser coordinate system. Nevertheless, the processing order of the steps described here is an example, and processing can also be performed in a different order.

As described above, in the calibration method of this embodiment, a plurality of scanners 513 and 523 are used, the irradiation traces having different shapes are formed at the same target position on the calibration plate T, and the irradiation traces are simultaneously imaged. Thus, even in the additive manufacturing apparatus 1 provided with a plurality of scanners 513 and 523, the calibration of the laser coordinate systems related to each of the scanners 513 and 523 can be performed simultaneously. As a result, mutual errors between the scanners 513 and 523 can be reduced, and the deviation amount between the target positions and the irradiated positions can be acquired at a relatively high speed. Further, when the imaging device 7 is moved directly above the target position when imaging the irradiation traces by using a driving device such as the processing head driving device 63, since it is possible to simultaneously image the overlapping irradiation traces with one movement, mechanical errors due to the driving device such as the processing head driving device 63 can also be reduced.

With the additive manufacturing apparatus 1 calibrated as described above, additive manufacturing for obtaining the desired three-dimensional molded object is performed.

First, the base plate 91 is installed on the molding table 2, and the chamber 11 is filled with the inert gas having the predetermined concentration.

Subsequently, the material layer forming step of forming the material layer 93 in the molding region R is performed. The molding table 2 is adjusted to an appropriate height at which the material layer 93 having a predetermined thickness can be formed, and the recoater head 42 moves horizontally on the molding region R. The material discharged from the recoater head 42 is flattened by the blades to form the material layer 93.

Then, the solidifying step of using the irradiation device 5 to irradiate a predetermined irradiation region of the material layer 93 with the laser beams L1 and L2 to form the solidified layer 95 is performed. At this time, the command related to the scanning of the laser beams L1 and L2 specified in the molding program is corrected by the correction data of the laser coordinate systems.

The material layer forming step and the solidifying step as described above are repeated, and a plurality of solidified layers 95 are laminated to produce the desired three-dimensional molded object.

In addition, a cutting step of cutting the surface of the solidified layer 95 may be performed every time a predetermined number of solidified layers 95 are formed. By performing the cutting step, a more accurate three-dimensional molded object can be obtained.

The disclosure is not limited to the configuration of the embodiments shown in the drawings, as some examples have already been specifically shown, and various modifications or applications are possible without departing from the technical idea of the disclosure.

What is claimed is:

1. A calibration method of an additive manufacturing apparatus, which forms a three-dimensional molded object by repeating a material layer forming step of forming a material layer on a molding region that is a region in which the three-dimensional molded object is formed, and a solidifying step of irradiating the material layer with laser beams respectively scanned by a plurality of scanners to form a solidified layer, the calibration method comprising: an irradiation trace forming step of scanning the laser beams with each of the plurality of scanners with respect to a plurality of target positions on a calibration plate installed on the molding region, and forming a plurality of irradiation traces having different shapes for each of the plurality of scanners at each of the plurality of target positions; an imaging step of simultaneously imaging the plurality of irradiation traces formed with respect to a same target position among the plurality of target positions with an imaging device that has an imaging sensor; a specifying step of specifying a plurality of irradiated positions of the laser beams scanned by each of the plurality of scanners based on the plurality of irradiation traces imaged in the imaging step; and a correction step of generating correction data that specifies a deviation amount at any point of a laser coordinate system related to each of the plurality of scanners based on the plurality of irradiated positions specified in the specifying step.

2. The calibration method of the additive manufacturing apparatus according to claim 1, wherein in the irradiation trace forming step, the laser beams scanned by each of the plurality of scanners are simultaneously irradiated on the calibration plate.

3. The calibration method of the additive manufacturing apparatus according to claim 1, wherein in the specifying step, a center of gravity of each of the plurality of irradiation traces formed by at least one of the laser beams scanned by at least one of the plurality of scanners is specified as one of the plurality of irradiated positions.

4. The calibration method of the additive manufacturing apparatus according to claim 1, wherein each of the plurality of irradiation traces formed by at least one of the laser beams scanned by at least one of the plurality of scanners has two line segments that intersect, and in the specifying step, an intersection of the line segments is specified as one of the plurality of irradiated positions.

5. The calibration method of the additive manufacturing apparatus according to claim 1, wherein the plurality of target positions are arranged in a grid pattern at predetermined intervals on the molding region.

6. The calibration method of the additive manufacturing apparatus according to claim 1, wherein in the imaging step, the imaging device is moved directly above each of the plurality of target positions.

7. The calibration method of the additive manufacturing apparatus according to claim 6, wherein the additive manufacturing apparatus comprises a processing device that cuts the solidified layer, the processing device comprises a cutting tool, a processing head that holds the cutting tool, and a processing head driving device that has an actuator and moves the processing head to any position above the molding region, and the imaging device is provided on the processing head.

\* \* \* \* \*